(12) United States Patent
Inagaki et al.

(10) Patent No.: US 12,174,028 B2
(45) Date of Patent: Dec. 24, 2024

(54) PARKING ASSISTANCE DEVICE (71) Applicants: AISIN CORPORATION, Kariya (JP); TOYOTA JIDOSHA KABUSHIKI KAISHA, Toyota (JP)

(72) Inventors: Hiroki Inagaki, Kariya (JP); Yusuke Kiyokawa, Kariya (JP); Norio Imai, Kariya (JP); Takuya Nakagawa, Nagoya (JP); Motonari Obayashi, Nagakute (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 283 days.

(21) Appl. No.: 17/953,727

(22) Filed: Sep. 27, 2022

(65) Prior Publication Data
US 2023/0093819 A1 Mar. 30, 2023

(30) Foreign Application Priority Data
Sep. 30, 2021 (JP) .................. 2021-162025

(51) Int. Cl.
*G01C 21/34* (2006.01)
*G06V 20/58* (2022.01)

(52) U.S. Cl.
CPC ....... *G01C 21/3461* (2013.01); *G06V 20/586* (2022.01)

(58) Field of Classification Search
CPC .......................... G01C 21/3461; G06V 20/586
USPC .................... 701/41, 42, 43, 44, 70
See application file for complete search history.

(56) References Cited

U.S. PATENT DOCUMENTS

| 9,783,231 | B2* | 10/2017 | Freistadt | B62D 15/0285 |
| 10,737,726 | B2* | 8/2020 | Matsumoto | H04N 7/18 |
| 10,810,446 | B2* | 10/2020 | Hayakawa | G06T 7/60 |
| 11,242,048 | B2* | 2/2022 | Suzuki | G06V 20/588 |
| 2016/0075327 | A1 | 3/2016 | Kiyokawa et al. | |
| 2016/0114795 | A1* | 4/2016 | Kiyokawa | G01S 13/931 342/55 |

FOREIGN PATENT DOCUMENTS

| JP | 2016-60241 A | 4/2016 |
| JP | 2019-128844 A | 8/2019 |

* cited by examiner

*Primary Examiner* — Hai H Huynh
(74) *Attorney, Agent, or Firm* — Sughrue Mion, PLLC (57) ABSTRACT

A parking assistance device includes an obstacle detection unit configured to detect an obstacle around a vehicle, a boundary detection unit configured to detect a boundary of a parking section, and a target position determination unit configured to determine a target position of a movement route of the vehicle based on the detected boundary. The target position determination unit recognizes, as a wheel stopper, the obstacle detected in a detection area that is set at a position in the parking section on a back side of an entrance and exit of the parking section based on the detected boundary, regardless of a height of the obstacle.

3 Claims, 9 Drawing Sheets

PARKING ASSISTANCE DEVICE

CROSS REFERENCE TO RELATED APPLICATIONS

This application is based on and claims priority under 35 U.S.C. § 119 to Japanese Patent Application 2021-162025, filed on Sep. 30, 2021, the entire content of which is incorporated herein by reference.

TECHNICAL FIELD

This disclosure relates to a parking assistance device.

BACKGROUND DISCUSSION

In related art, there is known a parking assistance device that determines a parking target position based on a detection result of a sensor.

Examples of the related art include JP 2019-128844A (Reference 1).

In the related art described above, for example, in a parking section provided with a wheel stopper, the wheel stopper may be detected as an obstacle, and a narrow range in front of the wheel stopper avoiding the wheel stopper in the parking section may be identified as a space available for parking. In this case, a target position may not be set in the parking section for a vehicle having a size that does not fall within the range.

A need thus exists for a parking assistance device which is not susceptible to the drawback mentioned above.

SUMMARY

According to one aspect, a parking assistance device includes: an obstacle detection unit configured to detect an obstacle around a vehicle; a boundary detection unit configured to detect a boundary of a parking section; and a target position determination unit configured to determine a target position of a movement route of the vehicle based on the detected boundary. The target position determination unit recognizes, as a wheel stopper, the obstacle detected in a detection area that is set at a position in the parking section on a back side of an entrance and exit of the parking section based on the detected boundary, regardless of a height of the obstacle.

BRIEF DESCRIPTION OF THE DRAWINGS

The foregoing and additional features and characteristics of this disclosure will become more apparent from the following detailed description considered with the reference to the accompanying drawings, wherein:

FIG. 1 is an exemplary perspective view showing a state in which a part of a vehicle compartment of a vehicle according to an embodiment is seen through;

DETAILED DESCRIPTION

Hereinafter, exemplary embodiments of the disclosed will be disclosed. A configuration of the embodiment described below and operations, results, and effects provided by the configuration are examples. The disclosure will be implemented with configurations other than that disclosed in the following embodiment, and at least one of the effects and derived effects based on the basic configuration can be attained.

Figure 1:
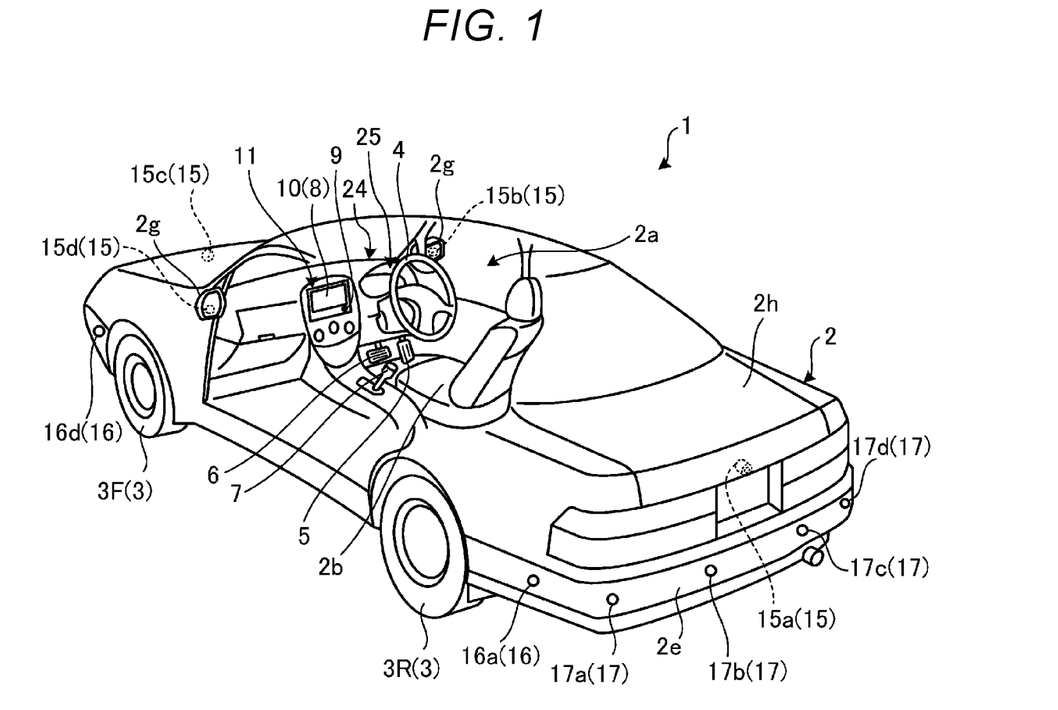

FIG. 1 is an exemplary perspective view showing a state in which a part of a vehicle compartment of a vehicle according to the embodiment is seen through. A vehicle 1 according to the present embodiment may be, for example, an automobile using an internal combustion engine (not shown) as a drive source, that is, an internal combustion engine automobile, an automobile using an electric motor (not shown) as a drive source, that is, an electric automobile, a fuel cell automobile, or the like, a hybrid automobile using both the internal combustion engine and the electric motor as drive sources, or an automobile including another drive source. The vehicle 1 can be equipped with various transmission devices, and can be equipped with various devices necessary for driving the internal combustion engine and the electric motor, for example, systems and components. A method, a number, a layout, and the like of devices related to driving of wheels 3 in the vehicle 1 can be variously set.

As shown in FIG. 1, a vehicle body 2 includes a vehicle compartment 2a for an occupant (not shown) to get in. The vehicle compartment 2a is provided therein with a steering unit 4, an acceleration operation unit 5, a brake operation unit 6, a shift operation unit 7, and the like in a state of facing a seat 2b of a driver as the occupant. The steering unit 4 is, for example, a steering wheel protruding from a dashboard 24, the acceleration operation unit 5 is, for example, an accelerator pedal located under a foot of the driver, the brake operation unit 6 is, for example, a brake pedal located under a foot of the driver, and the shift operation unit 7 is, for example, a shift lever protruding from a center console. The steering unit 4, the acceleration operation unit 5, the brake operation unit 6, the shift operation unit 7, and the like are not limited thereto.

The vehicle compartment 2a is also provided therein with a display device 8 as a display output unit and an audio output device 9 as an audio output unit. The display device 8 is, for example, a liquid crystal display (LCD) or an organic electroluminescent display (OELD). The audio output device 9 is, for example, a speaker. The display device 8 is covered with a transparent operation input unit 10 such as a touch panel. The occupant can visually recognize an image displayed on a display screen of the display device 8 through the operation input unit 10. In addition, the occupant can perform an operation input by touching, pressing, or moving on the operation input unit 10 with a finger or the like at a position corresponding to the image displayed on the display screen of the display device 8. The display device 8, the audio output device 9, the operation input unit 10, and the like are provided on, for example, a monitor device 11 located at a central portion of the dashboard 24 in a vehicle width direction, that is, a left-right direction. The monitor device 11 may include an operation input unit (not shown) such as a switch, a dial, a joystick, or a push button. An audio output device (not shown) may also be provided at another position in the vehicle compartment 2a different from that of the monitor device 11, and audio may be output from the audio output device 9 of the monitor device 11 and another audio output device. The monitor device 11 may also be used as a navigation system or an audio system, for example.

Figure 2:
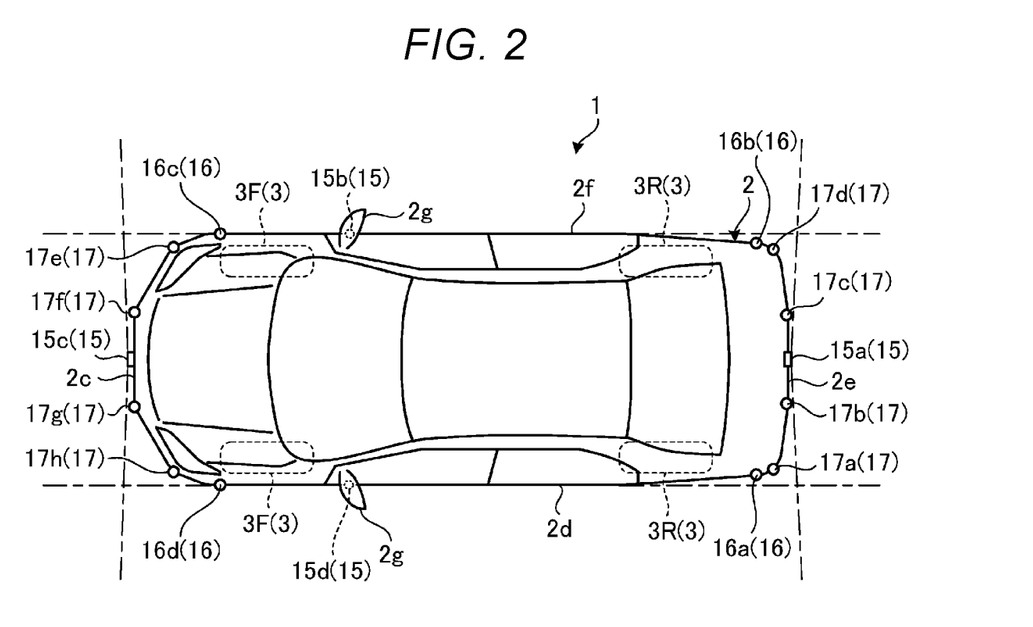
FIG. 2 is an exemplary plan view (overhead view) of the vehicle according to the embodiment.
Figure 3:
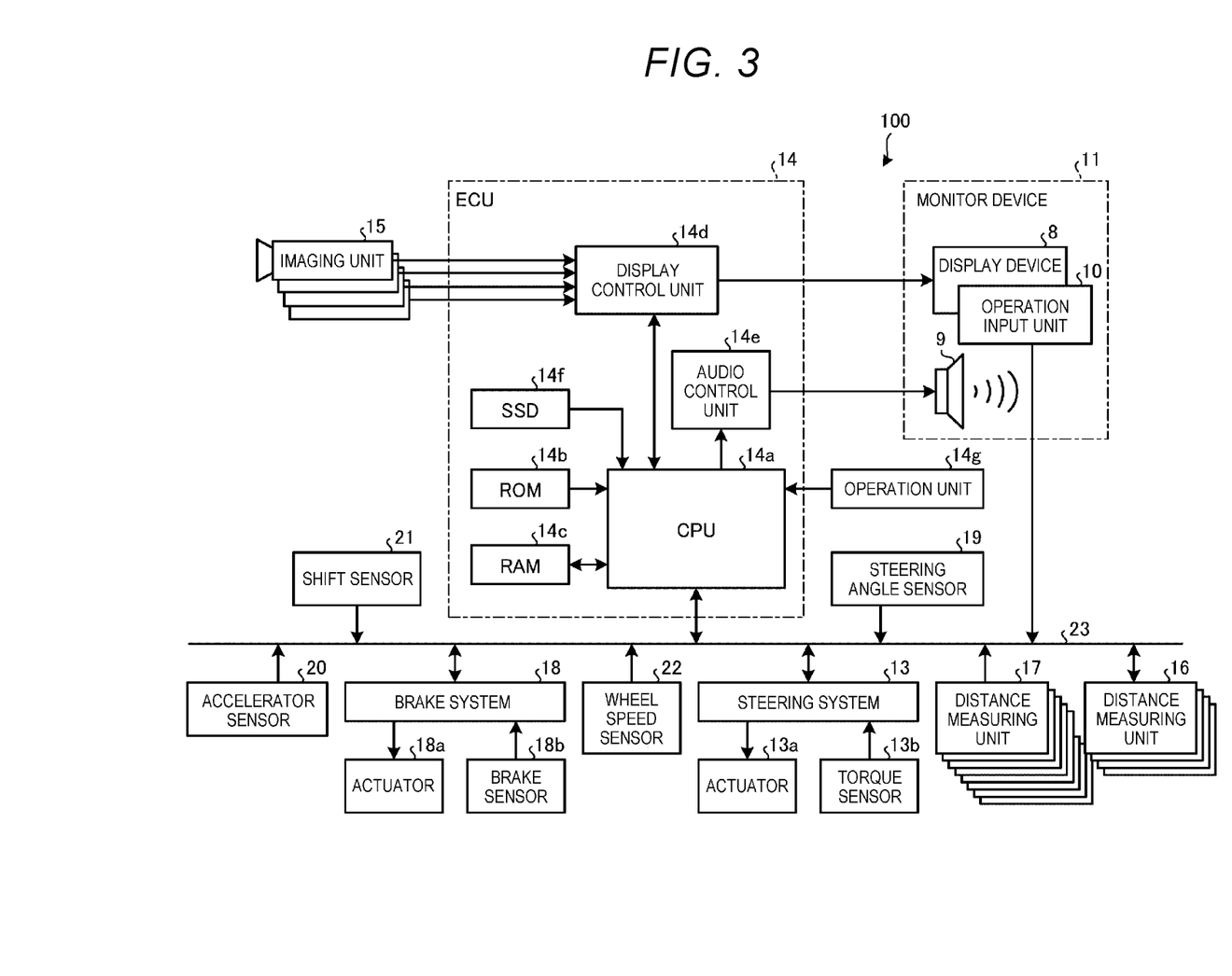
FIG. 3 is an exemplary block diagram of a configuration of a parking assistance system according to the embodiment.

FIG. 2 is an exemplary plan view (overhead view) of the vehicle according to the embodiment. As shown in FIGS. 1 and 2, the vehicle 1 is, for example, a four-wheeled automobile, and includes two left and right front wheels 3F and two left and right rear wheels 3R. All of the four wheels 3 may be steerable. As shown in FIG. 3, the vehicle 1 includes a steering system 13 that steers at least two wheels 3. The steering system 13 includes an actuator 13a and a torque sensor 13b. The steering system 13 is electrically controlled by an electronic control unit (ECU) 14 or the like to operate the actuator 13a. The steering system 13 is, for example, an electric power steering system or a steer by wire (SBW) system. The steering system 13 adds a torque, that is, an assist torque to the steering unit 4 by the actuator 13a to supplement a steering force, and steers the wheels 3 by the actuator 13a. In this case, the actuator 13a may steer one wheel 3 or a plurality of wheels 3. The torque sensor 13b detects, for example, a torque applied to the steering unit 4 by the driver.

As shown in FIG. 2, the vehicle body 2 is provided with, for example, four imaging units 15a to 15d as a plurality of imaging units 15. The imaging unit 15 is, for example, a digital camera in which an imaging element such as a charge coupled device (CCD) or a CMOS image sensor (CIS) is provided. The imaging unit 15 can output video data at a predetermined frame rate. Each imaging unit 15 includes a wide-angle lens or a fisheye lens, and can capture an image, for example, in a range of 140° to 190° in a horizontal direction. An optical axis of the imaging unit 15 is set obliquely downward. Therefore, the imaging unit 15 sequentially captures images of an external environment around the vehicle body 2 including a road surface on which the vehicle 1 can move and an area where the vehicle 1 can be parked, and outputs the captured images as captured image data.

For example, the imaging unit 15a is located at an end portion 2e of the vehicle body 2 on a rear side, and is provided on a lower wall portion of a door 2h of a rear trunk. For example, the imaging unit 15b is located at an end portion 2f of the vehicle body 2 on a right side, and is provided on a door mirror 2g on the right side. For example, the imaging unit 15c is located at an end portion 2c of the vehicle body 2 on a front side, that is, a front side in a vehicle front-rear direction, and is provided on a front bumper or the like. For example, the imaging unit 15d is located at an end portion 2d of the vehicle body 2 on a left side, that is, a left side in the vehicle width direction, and is provided on the door mirror 2g as a protrusion on the left side. The ECU 14 can execute calculation processing and image processing based on the image data obtained by the plurality of imaging units 15 so as to generate an image with a wider viewing angle or to generate a virtual overhead view image of the vehicle 1 as viewed from above. The overhead view image may also be referred to as a planar image.

The ECU 14 identifies a dividing line or the like indicated on the road surface around the vehicle 1 from the image of the imaging unit 15, and detects (extracts) a parking section indicated by the dividing line or the like.

As shown in FIGS. 1 and 2, the vehicle body 2 is provided with, for example, four distance measuring units 16a to 16d and eight distance measuring units 17a to 17h as a plurality of distance measuring units 16, 17. Each of the distance measuring units 16, 17 is, for example, a sonar that emits an ultrasonic wave and captures a reflected wave thereof. The sonar may also be referred to as a sonar sensor or an ultrasonic detector. The ECU 14 can measure presence or absence of an object such as an obstacle located around the vehicle 1 and a distance to the object based on detection results of the distance measuring units 16, 17. That is, each of the distance measuring units 16, 17 is an example of a detection unit that detects an object. The distance measuring unit 17 may be used, for example, to detect an object at a relatively short distance, while the distance measuring unit 16 may be used, for example, to detect an object at a relatively long distance farther than that of the distance measuring unit 17. For example, the distance measuring unit 17 may be used to detect objects in front of and behind the vehicle 1, and the distance measuring unit 16 may be used to detect objects on lateral sides of the vehicle 1. The distance measuring units 16, 17 may be radar devices or the like.

FIG. 3 is an exemplary block diagram of a configuration of a parking assistance system according to the embodiment. As shown in FIG. 3, in a parking assistance system 100, in addition to the ECU 14, the monitor device 11, the steering system 13, the distance measuring units 16, 17, and the like, a brake system 18, a steering angle sensor 19, an accelerator sensor 20, a shift sensor 21, a wheel speed sensor 22, and the like are electrically connected via an in-vehicle network 23 as an electric communication line. The in-vehicle network 23 is, for example, a controller area network (CAN). The ECU 14 can control the steering system 13, the brake system 18, and the like by transmitting a control signal through the in-vehicle network 23. The ECU 14 can receive detection results of the torque sensor 13b, a brake sensor 18b, the steering angle sensor 19, the distance measuring units 16, the distance measuring units 17, the accelerator sensor 20, the shift sensor 21, the wheel speed sensor 22 and the like, operation signals of the operation input unit 10 and the like, and the like via the in-vehicle network 23.

The ECU 14 includes, for example, a central processing unit (CPU) 14a, a read only memory (ROM) 14b, a random access memory (RAM) 14c, a display control unit 14d, an audio control unit 14e, and a solid state drive (SSD, flash memory) 14f. The CPU 14a can execute various types of calculation processing and control such as image processing related to an image displayed on the display device 8, determination of a target position of the vehicle 1, calculation of a movement route of the vehicle 1, determination of presence or absence of interference with an object, automatic control of the vehicle 1, and cancellation of the automatic control. The CPU 14a can read out a program installed and stored in a non-volatile storage device such as the ROM 14b, and execute calculation processing according to the program. The RAM 14c temporarily stores various data to be used in calculation by the CPU 14*a*. The display control unit 14*d* mainly executes the image processing using the image data obtained by the imaging units 15, synthesis of image data displayed on the display device 8, and the like, among the calculation processing executed by the ECU 14. The audio control unit 14*e* mainly executes processing on audio data output from the audio output device 9, among the calculation processing executed by the ECU 14. The SSD 14*f* is a rewritable non-volatile storage unit, and can store data even when power of the ECU 14 is turned off. The CPU 14*a*, the ROM 14*b*, the RAM 14*c*, and the like may be integrated in the same package. The ECU 14 may also have a configuration in which another logical operation processor such as a digital signal processor (DSP), a logic circuit or the like is used instead of the CPU 14*a*. A hard disk drive (HDD) may be provided instead of the SSD 14*f*, or the SSD 14*f* and the HDD may be provided separately from the ECU 14. The ECU 14 is an example of a parking assistance device.

The brake system 18 is, for example, an anti-lock brake system (ABS) that prevents locking of a brake, a skid prevention device (electronic stability control: ESC) that prevents a skid of the vehicle 1 during cornering, an electric brake system that enhances a braking force (executes brake assist), or a brake by wire (BBW). The brake system 18 applies a braking force to the wheels 3 and thus the vehicle 1 via the actuator 18*a*. The brake system 18 can detect signs of locking of the brake, idling of the wheels 3, a skid, and the like based on a rotation difference between the left and right wheels 3 and the like, and can execute various types of control. The brake sensor 18*b* is, for example, a sensor that detects a position of a movable portion of the brake operation unit 6. The brake sensor 18*b* can detect a position of a brake pedal as the movable portion. The brake sensor 18*b* includes a displacement sensor.

The steering angle sensor 19 is, for example, a sensor that detects a steering amount of the steering unit 4 such as the steering wheel. The steering angle sensor 19 is implemented by, for example, a Hall element. The ECU 14 obtains the steering amount of the steering unit 4 by the driver, a steering amount of each wheel 3 during automatic steering, and the like from the steering angle sensor 19 to execute various types of control. The steering angle sensor 19 detects a rotation angle of a rotation portion included in the steering unit 4. The steering angle sensor 19 is an example of an angle sensor.

The accelerator sensor 20 is, for example, a sensor that detects a position of a movable portion of the acceleration operation unit 5. The accelerator sensor 20 can detect a position of an accelerator pedal as the movable portion. The accelerator sensor 20 includes a displacement sensor.

The shift sensor 21 is, for example, a sensor that detects a position of a movable portion of the shift operation unit 7. The shift sensor 21 can detect a position of a lever, an arm, a button, or the like as the movable portion. The shift sensor 21 may include a displacement sensor or may be a switch.

The wheel speed sensor 22 is a sensor that detects a rotation amount and a rotation speed per time unit of the wheel 3. The wheel speed sensor 22 outputs a wheel speed pulse number indicating the detected rotation speed as a sensor value. The wheel speed sensor 22 may be implemented by, for example, a Hall element. The ECU 14 calculates a movement amount and the like of the vehicle 1 based on the sensor value obtained from the wheel speed sensor 22 to execute various types of control. The wheel speed sensor 22 may be provided in the brake system 18. In this case, the ECU 14 acquires a detection result of the wheel speed sensor 22 via the brake system 18.

Configurations, arrangements, electrical connection forms, and the like of the various sensors and actuators described above are merely examples, and can be variously set (changed).

Figure 4:
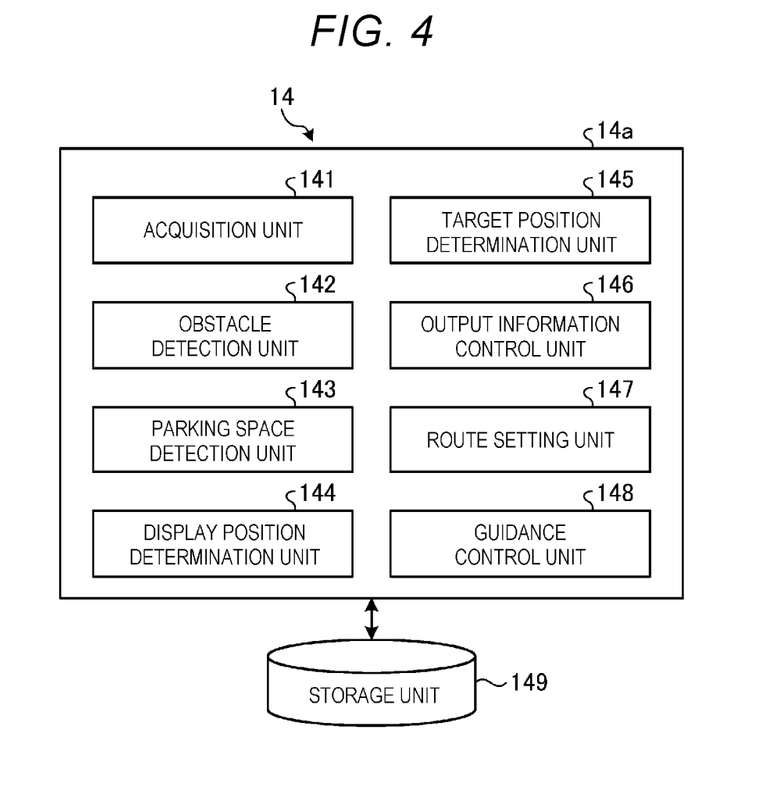
FIG. 4 is an exemplary block diagram of a configuration of a part of an ECU (parking assistance device) of the parking assistance system according to the embodiment.

FIG. 4 is an exemplary block diagram of a configuration of a part of the ECU (parking assistance device) of the parking assistance system according to the embodiment. As shown in FIG. 4, the ECU 14 includes an acquisition unit 141, an obstacle detection unit 142, a parking section detection unit 143, a display position determination unit 144, a target position determination unit 145, an output information control unit 146, a route setting unit 147, a guidance control unit 148, a storage unit 149, and the like. The CPU 14*a* functions as the acquisition unit 141, the obstacle detection unit 142, the parking section detection unit 143, the display position determination unit 144, the target position determination unit 145, the output information control unit 146, the route setting unit 147, the guidance control unit 148, and the like by executing processing according to programs. The storage unit 149 stores data to be used in calculation processing of the units, data resulting from the calculation processing, and the like. At least a part of functions of the above-described units may be implemented by hardware.

The acquisition unit 141 acquires various data, signals, and the like. The acquisition unit 141 acquires, for example, data and signals such as detection results of the sensors, operation input, instruction input, and image data. The acquisition unit 141 can acquire a signal based on operation input from an operation unit 14*g*. The operation unit 14*g* is, for example, a push button or a switch.

The obstacle detection unit 142 detects an obstacle that interferes with traveling of the vehicle 1. The obstacle is, for example, another vehicle, a wall, a pillar, a fence, a protrusion, a step, a wheel stopper, or an object. The obstacle detection unit 142 can detect presence or absence, a height, a size, and the like of the obstacle by various methods. The obstacle detection unit 142 can detect the obstacle based on, for example, detection results of the distance measuring units 16, 17. Alternatively, the obstacle detection unit 142 may detect the height of the obstacle based on the detection results of the distance measuring units 16, 17 and heights of respective beams. The obstacle detection unit 142 may detect the presence or absence or the height of the obstacle based on a detection result of the wheel speed sensor 22 or an acceleration sensor (not shown) and the detection results of the distance measuring units 16, 17. The obstacle detection unit 142 may detect the height of the obstacle by, for example, image processing based on an image captured by the imaging unit 15.

The parking section detection unit 143 detects a parking section provided as a sign or an object. The parking section is a section serving as a guide or a reference set to park the vehicle 1 at the place. A parking boundary (boundary) is a boundary or an outer edge of the parking section, and is, for example, a dividing line, a frame line, a straight line, a band, a step, and an edge thereof. That is, the parking boundary is a sign, an object, or the like. The parking section detection unit 143 can detect the parking section and the parking boundary by, for example, image processing based on an image captured by the imaging unit 15. The parking section detection unit 143 is an example of a boundary detection unit.

The display position determination unit 144 determines a display position of a display element serving as a guide or a target for guiding the vehicle 1 based on, for example, at least one of a detection result of the obstacle detection unit 142 and a detection result of the parking section detection unit 143. The display position may correspond to an end point of a movement route or may correspond to a middle of the movement route. The display element may be set as, for example, a point, a line, a frame, or an area displayed on the display device 8.

The target position determination unit 145 determines a target position that is a position serving as a guide or a target for guiding the vehicle 1 based on, for example, at least one of the detection result of the obstacle detection unit 142 and the detection result of the parking section detection unit 143. The target position may correspond to the end point of the movement route or may correspond to the middle of the movement route. The target position may be set as, for example, a point, a line, a frame, or an area. The target position may be the same as the display position. The target position is an example of a parking target position.

The output information control unit 146 controls the display control unit 14d and the audio control unit 14e and thus the display device 8 and the audio output device 9 such that the display device 8 and audio output device 9 output desired information in a desired form at stages such as start and end of parking assistance, determination of the target position, route calculation, and guidance control.

The route setting unit 147 sets a movement route from a current position to a target position of the vehicle 1 by a known method or the like based on, for example, the current position of the vehicle 1, that is, a host vehicle, the determined target position, or a detection result of an obstacle. The route setting unit 147 can update the target position when the vehicle 1 is guided by the guidance control unit 148. The route setting unit 147 can determine the target position by a method similar to that of the target position determination unit 145. However, the route setting unit 147 sets the target position using a height of the obstacle that is detected when the vehicle 1 is guided by the guidance control unit 148.

The guidance control unit 148 controls the units such that the vehicle 1 moves along the calculated movement route. That is, the guidance control unit 148 guides the vehicle 1. For example, in the vehicle 1 that moves due to creep or the like without operating the accelerator pedal, the guidance control unit 148 can move the vehicle 1 along the movement route by controlling the steering system 13 according to a position of the vehicle 1. The guidance control unit 148 can control not only the steering system 13 but also a drive mechanism such as an engine or a motor, the brake system 18 as a brake mechanism, and the like. The guidance control unit 148 may control, for example, the output information control unit 146, the display control unit 14d, the audio control unit 14e and thus the display device 8 and the audio output device 9 to guide the driver to move the vehicle 1 along the movement route by display output or audio output according to the position of the vehicle 1.

The storage unit 149 stores data to be used in calculation by the ECU 14 or data calculated in the calculation by the ECU 14.

Figure 5:
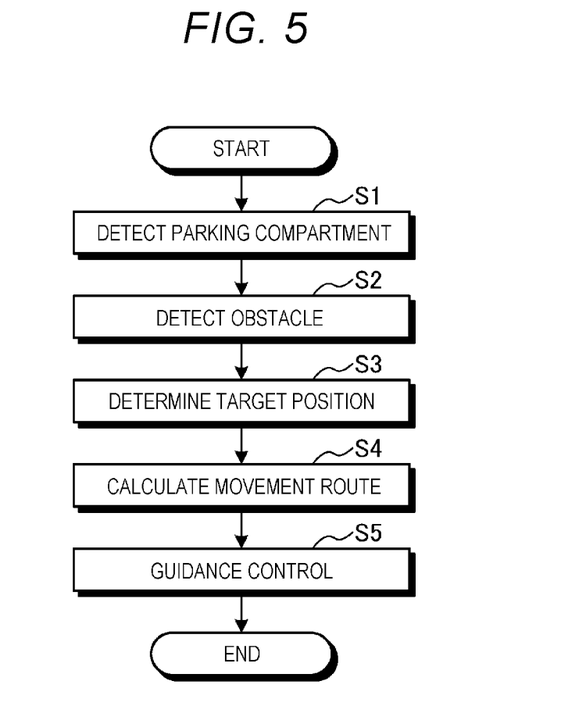
FIG. 5 is a flowchart showing an example of a procedure of processing executed by the parking assistance device according to the embodiment.

FIG. 5 is a flowchart showing an example of a procedure of processing executed by the parking assistance device according to the embodiment. In the parking assistance system 100, the processing is executed according to the procedure shown in FIG. 5. First, the parking section detection unit 143 detects a parking section and a parking boundary (S1), and the obstacle detection unit 142 detects an obstacle (S2). Next, the target position determination unit 145 determines a target position of a movement route of the vehicle 1 based on a detection result in S1 or S2 (S3). Next, the route setting unit 147 calculates the movement route from a current position of the vehicle 1 to the determined target position (S4). Next, the guidance control unit 148 controls the units such that the vehicle 1 moves along the calculated movement route (S5). The target position, the movement route, and the like may be appropriately corrected or updated while the vehicle 1 is moving along the movement route.

Figure 6:
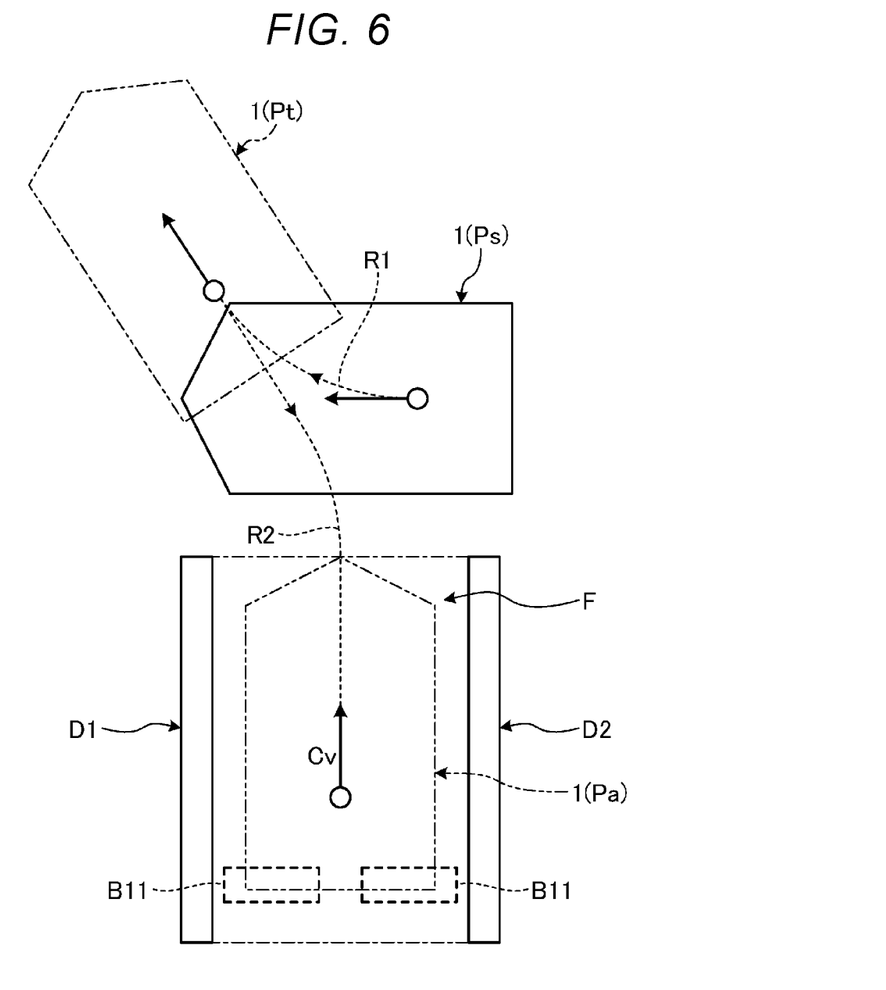
FIG. 6 is an exemplary and schematic plan view showing an initial position, a route, and a target position of the vehicle when the target position is set for a parking section by the parking assistance device according to the embodiment.
Figure 7:
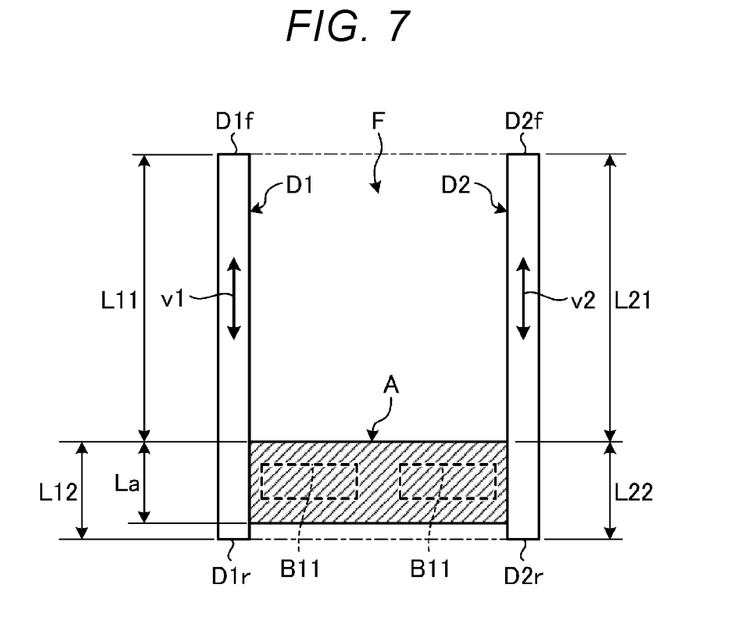
FIG. 7 is an exemplary and schematic plan view showing boundaries of the parking section detected by the parking assistance device according to the embodiment, a predetermined range corresponding to the boundaries, and obstacles detected within the predetermined range.
Figure 8:
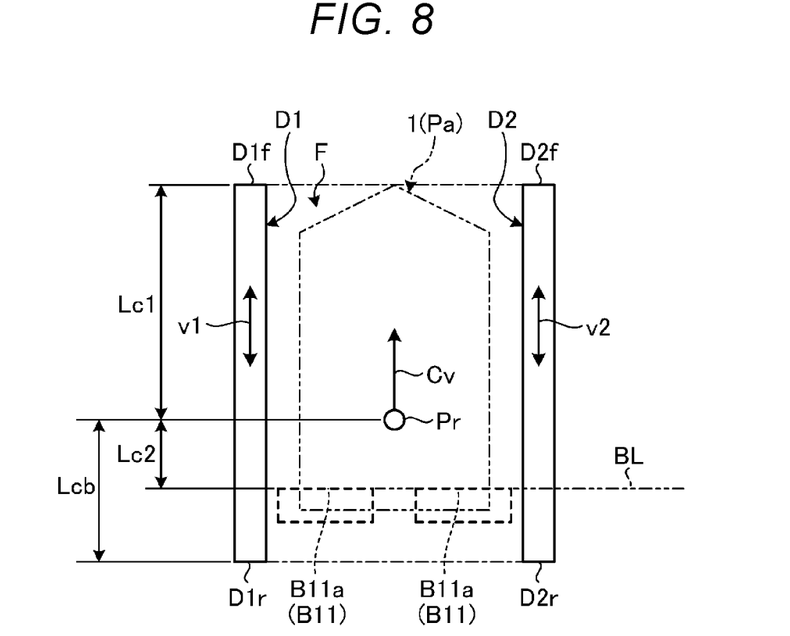
FIG. 8 is an exemplary and schematic plan view showing the boundaries of the parking section detected by the parking assistance device according to the embodiment, the detected obstacles, and a set target position.

Next, a procedure of determining the target position by the ECU 14 of the parking assistance system 100 according to the present embodiment will be exemplified with reference to FIGS. 6 to 8. FIG. 6 is an exemplary and schematic plan view showing an initial position, a route, and a target position of the vehicle when the target position is set corresponding to a parking section by the parking assistance device according to the embodiment. FIG. 7 is an exemplary and schematic plan view showing boundaries of the parking section detected by the parking assistance device according to the embodiment, a predetermined range corresponding to the boundaries, and obstacles detected within the predetermined range. FIG. 8 is an exemplary and schematic plan view showing the boundaries of the parking section detected by the parking assistance device according to the embodiment, the detected obstacles, and a set target position.

Here exemplifies a procedure of determining a target position Pa when the vehicle 1 located at an initial position Ps as shown in FIG. 6 moves along routes R1, R2 along which the vehicle 1 turns back at a turning back position Pt, and moves to the target position Pa. The target position Pa and the routes R1, R2 are set based on detection results of parking boundaries D1, D2, obstacles B11, other obstacles (not shown), and the like at the initial position Ps. Specifically, for example, in the ECU 14, the detected positions of the parking boundaries D1, D2, the obstacles B11, and the like are converted into positions on coordinates in a plan view from above the vehicle 1 as shown in FIG. 6 by, for example, calibration or coordinate conversion based on geometric calculation, and the target position Pa, the routes R1, R2, and the like are calculated on the coordinates.

In an example of FIG. 6, the target position Pa is set between the detected parking boundaries D1, D2 of a parking section F. Here, the target position determination unit 145 recognizes the obstacles B11 as a wheel stopper regardless of heights of the obstacles B11. The obstacles B11 are detected in a detection area A that is set at a position in the parking section F on a back side of an entrance and exit of the parking section F based on the detected parking boundaries D1, D2. For example, the detection area A is set at a position on a back side in the parking section F based on the detected parking boundaries D1, D2. The target position Pa is set such that the vehicle 1 located at the target position Pa overlaps the obstacles B11. The detection area A is not limited to the back side of the parking section F in the parking section F. The detection area A may be at a position on the back side of the entrance and exit in the parking section F. Here, the entrance and exit of the parking section F is between an end portion D1f of the parking boundary D1 and an end portion D2f of the parking boundary D2.

As shown in FIG. 7, the detection area A where the obstacles B11 are detected is set within a range where a wheel stopper can be detected on the back side (rear side, lower side in FIG. 7) of an intermediate position of the parking section F in a front-rear direction based on the detected parking boundaries D1, D2. Specifically, the detection area A is, for example, an area between the two parking boundaries D1, D2, and is set within a range where a distance along a direction v1 from the end portion D1f of one parking boundary D1 on an entrance and exit side (front side, upper side in FIG. 7) is equal to or larger than a distance L11 and equal to or smaller than a distance (L11+ La). Here, the direction v1 is a direction (longitudinal direction) in which the parking boundary D1 extends, the length La is a length of the detection area A along the direction v1, and La<L11. The direction v1 may be calculated by, for example, least squares approximation of coordinates of pixels forming an image of the parking boundary D1.

The detection area A is not limited to the above example, and may be variously set. For example, the detection area A may be set within a range where a distance along the direction v1 from an end portion D1r of the parking boundary D1 on the back side (rear side, lower side in FIG. 7) is equal to or larger than a distance (L12−La) and equal to or smaller than the distance L12. Here, L12<L11. The detection area A may be set within a range where a distance along the direction v2 from the end portion D2f of the other parking boundary D2 on the entrance and exit side (front side, upper side in FIG. 7) is equal to or larger than a distance L21 and equal to or smaller than a distance (L21+La). Here, the direction v2 is a direction in which the parking boundary D2 extends, and L21=L11. The direction v2 may be calculated by, for example, least squares approximation of coordinates of pixels forming an image of the parking boundary D2. The detection area A may be set within a range where a distance along the direction v2 from an end portion D2r of the parking boundary D2 on the back side (rear side, lower side in FIG. 7) is equal to or larger than a distance (L22−La) and equal to or smaller than a distance L22. Here, L22=L12. The detection area A may be set in the above-described procedure with reference to the end portion (the end portion D1f or the end portion D2f) of the parking boundaries D1, D2 that protrudes to the entrance and exit side (front side, upper side in FIG. 7) along a direction between the directions v1, v2.

The detection area A is not limited to the above example as long as the detection area A is set at a position on the back side in the parking section F (section available for parking) determined based on the parking boundaries D1, D2. The position on the back side in the parking section F is, for example, a position on a back side of a center in a longitudinal direction of the parking boundaries D1, D2 in an area between the parking boundaries D1, D2. The back side is a side farther from the entrance and exit of the parking section F than a central position in the longitudinal direction, or a side farther from the vehicle 1 at the initial position. The detection area A may have various shapes such as an elliptical shape and an oval shape.

The obstacle detection unit 142 detects presence or absence of the obstacles B11 in the detection area A set based on the parking boundaries D1, D2. The obstacle detection unit 142 can detect an obstacle whose height is lower than a predetermined height (threshold) as the obstacle B11 that may overlap the vehicle 1 located at the target position Pa, and can detect an obstacle whose height is equal to or higher than the predetermined height as an obstacle that is different from the obstacle B11 and that avoids interference with the vehicle 1.

The obstacle detection unit 142 can detect an obstacle having a predetermined shape (first shape) among obstacles located in the detection area A as the obstacle B11 that may overlap the vehicle 1 located at the target position Pa. In this case, the obstacle detection unit 142 can detect the obstacle B11 by, for example, pattern matching. Specifically, for example, the obstacle detection unit 142 calculates a degree of shape similarity between reference data on a plurality of obstacles stored in the storage unit 149 and detection data (image) of an obstacle detected in the detection area A, and when the degree of similarity between the detection data and any one of the reference data is equal to or larger than a threshold, the obstacle detection unit 142 can detect the obstacle corresponding to the detection data as the obstacle B11. The obstacle detection unit 142 can detect the obstacle B11 by, for example, comparing feature data of obstacles. Specifically, for example, when a difference between a reference value of feature data stored in the storage unit 149 and a detection value of feature data of an obstacle detected in the detection area A is equal to or smaller than a threshold, the obstacle detection unit 142 can detect the obstacle as the obstacle B11. Examples of the feature data include a position (position of a center of gravity), a size (area), a length, a direction (angle with respect to the longitudinal direction of the parking boundary), and a height of the obstacle. In this case, the obstacle detection unit 142 may detect the obstacle as the obstacle B11 when a difference for each of a plurality of feature data is equal to or smaller than a threshold.

The target position determination unit 145 determines the target position Pa based on at least one of the parking boundaries D1, D2. In this case, for example, as shown in FIG. 8, the target position Pa is set such that a reference point Pr of the vehicle 1 located at the target position Pa is located at a distance Lc1 rearward along the direction v1 from the end portion D1f of the parking boundary D1 on the entrance and exit side. A direction Cv of the target position Pa is set to be a direction between the direction v1 and the direction v2. The target position Pa is set such that distances of the reference point Pr from the parking boundaries D1, D2 are equal to each other.

Here, as is apparent from FIG. 8, the vehicle 1 located at the target position Pa overlaps the obstacles B11. When the target position Pa is set further forward while avoiding the obstacles B11, the vehicle 1 located at the target position Pa may protrude forward from the parking section F, and a more appropriate target position Pa may not be set. In this regard, in the present embodiment, the target position determination unit 145 can set the target position Pa such that the vehicle 1 located at the target position Pa can overlap the obstacles B11. Therefore, for example, the number of cases where the target position Pa is not set decreases, and the target position Pa is more likely to be set at a more appropriate position.

The target position determination unit 145 can determine the target position Pa based on the obstacles B11 that can be assumed to be the wheel stopper. In this case, for example, as shown in FIG. 8, the target position Pa is set such that the reference point Pr is located forward by a distance Lc2 along the direction between the direction v1 and the direction v2 from extension portions B11a of the obstacles B11 extending so as to intersect the parking boundaries D1, D2. In this case, the extension portion B11a may be set as, for example, a portion of the obstacle B11 that intersects with one of the direction v1 and the direction v2 within a predetermined angle range including 90° and has a length within a predetermined range along the intersecting direction. The distance Lc2 may be set as a distance from a line BL obtained by least squares approximation of a pixel group forming an image of the extension portion B11a. In this case, by appropriately setting the distance Lc2 according to a dimension of the vehicle 1, the target position Pa can be set at or near a position where the rear wheels hit the obstacles B11 that may be assumed to be the wheel stopper and thus stop.

Although not shown, while the vehicle 1 is moving along the routes R1, R2 after the target position determination unit 145 determines the target position Pa, the route setting unit 147 can update the initial target position Pa based on detection results of the obstacle detection unit 142, the parking section detection unit 143, and the like during the movement. When the vehicle 1 enters the target position Pa (parking section F) by a predetermined distance, the route setting unit 147 can update the target position Pa using heights of the obstacles B11 that are detected when the vehicle 1 is guided, instead of recognizing the obstacles B11 in the detection area A as a wheel stopper regardless of the heights of the obstacles B11. When the vehicle 1 enters the target position Pa (parking section F) by the predetermined distance, the route setting unit 147 can update the target position Pa using the heights of the obstacles B11 in the detection area A that are detected when the vehicle 1 is guided. That is, the route setting unit 147 can update the target position Pa using the heights of the obstacles B11 in the detection area A that are detected when the vehicle 1 is guided, based on a normal detection result of the obstacle detection unit 142. After the target position Pa is determined by the target position determination unit 145, the route setting unit 147 may update the target position Pa using the heights of the obstacles B11 in the detection area A that are detected when the vehicle 1 is guided, regardless of whether the vehicle 1 entered the target position Pa. The predetermined distance is, for example, 1 m. The predetermined distance may be other than 1 m. As a distance from the vehicle 1 decreases, detection accuracy of the parking boundaries D1, D2 and the obstacles B11 may increase. Therefore, according to the present embodiment, the target position may be corrected more accurately.

As described above, in the present embodiment, the ECU 14 (parking assistance device) includes the obstacle detection unit 142, the parking section detection unit 143 (boundary detection unit), and the target position determination unit 145. The obstacle detection unit 142 detects the obstacles B11 around the vehicle 1. The target position determination unit 145 detects boundaries of the parking section F. The target position determination unit 145 determines the target positions Pa of the routes R1, R2 (movement routes) of the vehicle 1 based on the detected boundaries. The target position determination unit 145 recognizes, as a wheel stopper, the obstacles B11 detected in the detection area A that is set at a position in the parking section F on the back side of the entrance and exit of the parking section F based on the detected boundaries, regardless of heights of the obstacles B11.

According to such a configuration, the number of cases where the target position Pa can be set is more likely to increase as compared with a case where the target position Pa is set only in an area avoiding the obstacles B11 in the parking section F, for example.

The ECU 14 includes the route setting unit 147 that sets the routes R1, R2, and the guidance control unit 148 that guides the vehicle 1 to the target position Pa. The route setting unit 147 can update the target position Pa using the heights of the obstacles B11 that are detected when the vehicle 1 is guided by the guidance control unit 148.

According to such a configuration, for example, when the vehicle 1 is guided, the target position Pa can be updated according to the heights of the obstacles B11, and thus the target position Pa can be corrected with high accuracy.

When the vehicle 1 enters the target position Pa (parking section F) by a predetermined distance, the route setting unit 147 can update the target position Pa using the heights of the obstacles B11 in the detection area A that are detected when the vehicle 1 is guided.

According to such a configuration, for example, the target position can be updated according to the heights of the obstacles B11 in a state in which the vehicle 1 approaches the obstacles B11 in the detection area A, and thus a more appropriate target position Pa can be set.

Figure 9:
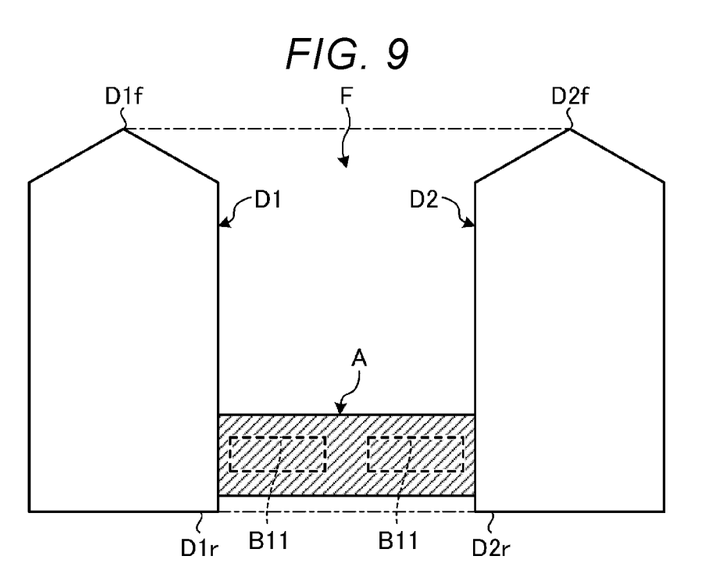
FIG. 9 is an exemplary and schematic plan view showing boundaries or the like of a parking section detected by a parking assistance device according to a first modification of the embodiment.

The parking section F is not limited to the example shown in FIG. 6. FIG. 9 is an exemplary and schematic plan view showing boundaries or the like of a parking section F detected by a parking assistance device according to a first modification of the embodiment. As shown in FIG. 9, the parking section F may be defined by two other vehicles parked side by side.

Although the embodiment disclosed here has been described above, the above embodiment is an example and is not intended to limit the scope of the disclosure. The embodiment can be implemented in various other forms, and various omissions, substitutions, combinations, and changes can be made without departing from the spirit of the disclosure. Configurations and shapes of the respective examples may be partially exchanged. Specifications (structure, type, direction, shape, size, length, width, height, number, arrangement, position, and the like) of each configuration, shape, and the like can be appropriately changed. The disclosure can be applied to parking assistance in various forms of parking lots and parking spaces. According to the disclosure, even when only one parking boundary is detected, the target position can be determined based on the one parking boundary, for example, by setting a target parallel to the parking boundary at a position that is a predetermined distance from the parking boundary. The disclosure can be applied to setting of a plurality of target position candidates.

According to one aspect, a parking assistance device includes: an obstacle detection unit configured to detect an obstacle around a vehicle; a boundary detection unit configured to detect a boundary of a parking section; and a target position determination unit configured to determine a target position of a movement route of the vehicle based on the detected boundary. The target position determination unit recognizes, as a wheel stopper, the obstacle detected in a detection area that is set at a position in the parking section on a back side of an entrance and exit of the parking section based on the detected boundary, regardless of a height of the obstacle.

According to such a configuration, the number of cases where the target position can be set is more likely to increase as compared with a case where the target position is set only in an area avoiding the obstacle in the parking section, for example.

The parking assistance device further includes, for example: a route setting unit configured to set the movement route; and a guidance control unit configured to guide the vehicle to the target position. The route setting unit can update the target position using the height of the obstacle that is detected when the vehicle is guided by the guidance control unit.

According to such a configuration, for example, when the vehicle is guided, the target position can be updated according to the height of the obstacle, and thus a more appropriate target position can be set.

In the parking assistance device, for example, when the vehicle enters the target position by a predetermined distance, the route setting unit is configured to update the target position using the height of the obstacle in the detection area that is detected when the vehicle is guided.

According to such a configuration, for example, the target position can be updated according to the height of the obstacle in a state in which the vehicle approaches the obstacle in the detection area, and thus a more appropriate target position can be set.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assistance device comprising:
   an obstacle detection unit configured to detect an obstacle around a vehicle;
   a boundary detection unit configured to detect a boundary of a parking section; and
   a target position determination unit configured to determine a target position of a movement route of the vehicle based on the detected boundary, wherein
   the target position determination unit recognizes, as a wheel stopper, the obstacle detected in a detection area that is set at a position in the parking section on a back side of an entrance and exit of the parking section based on the detected boundary, regardless of a height of the obstacle.

2. The parking assistance device according to claim 1, further comprising:
   a route setting unit configured to set the movement route; and
   a guidance control unit configured to guide the vehicle to the target position, wherein
   the route setting unit is configured to update the target position using the height of the obstacle that is detected when the vehicle is guided by the guidance control unit.

3. The parking assistance device according to claim 2, wherein
   the route setting unit is configured to, when the vehicle enters the target position by a predetermined distance, update the target position using the height of the obstacle in the detection area that is detected when the vehicle is guided.

* * * * *